US008125486B2

(12) United States Patent
DuBois et al.

(10) Patent No.: US 8,125,486 B2
(45) Date of Patent: Feb. 28, 2012

(54) COMBINING MULTI-LAYERED BITMAP FILES USING NETWORK SPECIFIC HARDWARE

(75) Inventors: David H. DuBois, Los Alamos, NM (US); Andrew J. DuBois, Santa Fe, NM (US); Carolyn Connor Davenport, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 1095 days.

(21) Appl. No.: 11/441,972

(22) Filed: May 25, 2006

(65) Prior Publication Data
US 2007/0195107 A1    Aug. 23, 2007

Related U.S. Application Data

(60) Provisional application No. 60/776,317, filed on Feb. 23, 2006.

(51) Int. Cl.
*G06F 15/00* (2006.01)
(52) U.S. Cl. ........ 345/501; 345/422; 345/520; 370/230; 370/360; 370/395.72; 370/401; 709/231
(58) Field of Classification Search ............. 375/240.17; 370/412, 395.72; 345/544, 629
See application file for complete search history.

(56) References Cited

U.S. PATENT DOCUMENTS

| | | | |
|---|---|---|---|
| 6,516,032 B1 * | 2/2003 | Heirich et al. ........... | 375/240.17 |
| 6,677,946 B1 * | 1/2004 | Ohba ........................... | 345/426 |
| 6,753,878 B1 * | 6/2004 | Heirich et al. ................ | 345/629 |
| 7,298,375 B1 * | 11/2007 | Hutchins ....................... | 345/561 |
| 7,394,815 B1 * | 7/2008 | Suzuki ..................... | 370/395.41 |
| 7,420,568 B1 * | 9/2008 | Bittel et al. .................... | 345/544 |
| 7,593,424 B2 * | 9/2009 | Yamane et al. ............... | 370/464 |
| 7,782,339 B1 * | 8/2010 | Hobbs et al. ................. | 345/626 |
| 2002/0024953 A1 * | 2/2002 | Davis et al. ................ | 370/395.1 |
| 2002/0054342 A1 * | 5/2002 | Fujiwara ..................... | 358/1.15 |
| 2002/0057669 A1 | 5/2002 | Joung | |
| 2003/0030642 A1 * | 2/2003 | Chen et al. .................... | 345/519 |
| 2004/0012607 A1 | 1/2004 | Witt | |
| 2004/0090974 A1 * | 5/2004 | Balakrishnan et al. ....... | 370/412 |
| 2005/0053028 A1 * | 3/2005 | Smith et al. .................. | 370/321 |
| 2005/0053077 A1 * | 3/2005 | Blanc et al. ............. | 370/395.72 |
| 2005/0076136 A1 * | 4/2005 | Cho et al. ...................... | 709/231 |
| 2005/0253873 A1 * | 11/2005 | Hutchins et al. .............. | 345/660 |
| 2006/0088107 A1 * | 4/2006 | Cancemi et al. ......... | 375/240.27 |
| 2007/0047535 A1 * | 3/2007 | Varma ........................... | 370/360 |
| 2007/0121499 A1 * | 5/2007 | Pal et al. ....................... | 370/230 |
| 2007/0165035 A1 * | 7/2007 | Duluk et al. .................. | 345/506 |

* cited by examiner

*Primary Examiner* — Xiao M. Wu
*Assistant Examiner* — Phi Hoang
(74) *Attorney, Agent, or Firm* — Luis M. Ortiz; Kermit D. Lopez; Tuesday Kaasch (57) ABSTRACT

Images and video can be produced by compositing or alpha blending a group of image layers or video layers. Increasing resolution or the number of layers results in increased computational demands. As such, the available computational resources limit the images and videos that can be produced. A computational architecture in which the image layers are packetized and streamed through processors can be easily scaled so to handle many image layers and high resolutions. The image layers are packetized to produce packet streams. The packets in the streams are received, placed in queues, and processed. For alpha blending, ingress queues receive the packetized image layers which are then z sorted and sent to egress queues. The egress queue packets are alpha blended to produce an output image or video.

18 Claims, 7 Drawing Sheets

COMBINING MULTI-LAYERED BITMAP FILES USING NETWORK SPECIFIC HARDWARE

CROSS REFERENCE TO RELATED APPLICATIONS

This patent application claims the priority and benefit of U.S. Provisional Patent Application No. 60/776,317 filed on Feb. 23, 2006 entitled "Combining Multi-layered Bitmap Files Using Network Specific Hardware" and which is incorporated herein by reference in its entirety.

STATEMENT OF GOVERNMENT INTEREST

The United States government has certain rights to the present disclosure in accordance with contract W-7405-ENG-36 with the National Nuclear Security Administration of the United States Department of Energy.

TECHNICAL FIELD

Embodiments relate to the fields of image processing, image alpha blending, and image compositing. Embodiments also relate to the fields of network processing, stream processing, and packetizing image data.

BACKGROUND

Digital images can be produced using imaging sensors, computer graphics, or both. Image sensors can be used to directly capture digital representations of an imaged scene. For example, a digital still camera can produce a digital image while a digital video recorder (DVR) can produce a digitized video of an imaged time varying scene. For simplicity, the term digital image shall be used to refer to both digital still images and digital video images. Computer graphics techniques can also be used to render digital images of scenes that do not exist in reality. Computer graphics techniques can also be used to combine digital images.

Image compositing is the process of combining multiple image layers into a single image. One type of image layer is an image having a specified "z value". For example, a foreground image layer can contain a person's image while a background image layer can contain a simulated space scene. The foreground image can have a z value equaling 0 while the background can have a z value of 1. The z values indicate that the foreground image is in front of the background image. Image compositing techniques can be used to combine the foreground image and the background image to produce an image of the person in front of the simulated space scene.

Another type of image layer is an image having a z value associated with every pixel in the image. Returning to the example above, the image layer containing a person's image can have a z value equaling fifty associated with every pixel while the space scene image layer can have z values ranging from 0 to 100. Image compositing can produce an image with the person inside the space scene.

More complex images can be produced by compositing many layers. One way to composite layers is to z sort and alpha blend them. Z sorting determines which pixel is in front of another pixel and alpha blending combines the pixels. A foreground pixel and a background pixel can be blended using the following equation:

$$V_{blended} = \alpha_{fg}(V_{fg}) + (1-\alpha_{fg})(V_{bg})$$

where $\alpha_{fg}$ is the foreground alpha value, $V_{fg}$ is the foreground pixel value, $V_{bg}$ is the background pixel value, and $V_{blended}$ is the alpha blended pixel value. Gray scale images usually use a single number to represent each pixel value while color images usually use three numbers to represent each pixel value. The three numbers for color pixels are often red, green, and blue saturation values. Those skilled in the art of digital image processing are familiar with alpha blending, techniques for alpha blending, and the application of alpha blending to large number of image layers.

Computational requirements limit what can be displayed to a user because the computational requirements for blending images increase as image resolution increases and as the number of layers increase. Addressing bottlenecks in computational power and data transmission can result in providing greater computational resources for blending more image layers having higher resolution.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

Systems and methods that result in an easily scalable image processing structure can be realized by breaking image layers into packets and streaming the packets through a series of processors.

An image layer can be transmitted as a packet stream. Clearly, a set of image layers can be transmitted as a set of packet streams. The packets themselves can be raw data packets or formatted data packets. Internet Protocol (IP) packets are formatted data packets. User Datagram Protocol (UDP) packets and Transmission Control Protocol (TCP) packets are particular types of IP packets. Those skilled in the art of image transmission know of systems and methods for packetizing and transmitting image layers as streams of IP, UDP, and TCP packets.

It is therefore an aspect of the embodiments to obtain at least two packet streams. A packet stream is a sequence of packets that are transmitted and received one after another. Each packet contains pixels and a z value. Each pixel contains an alpha value and a pixel value. A gray scale pixel has a single pixel value while a color pixel value usually has three values such as values corresponding to red, green, and blue saturation values.

It is also an aspect of the embodiments to load ingress queues with the packets from the packet streams. Network processors are specialized computer processors that are designed to efficiently receive, queue, and process multiple independent packet streams. A processor can receive a packet and store it directly in memory. The processor queues the stored packet by putting a data pointer into the queue with the data pointer pointing to the stored packet. A separate ingress queue can be used for each packet stream.

The packets can be reordered as they are received, as they are placed into the ingress queue, or after they are placed in the ingress queue. For example, each packet can be checked to see if it is out of order because each packet has a packet number. A packet that arrives too early can be held in temporary storage until its immediate predecessor is received. The early packet can then be queued.

It is an additional aspect of the embodiments to take the packets from the ingress queues, to z sort them to produce z sorted packets, and to send the z sorted packets to egress queues. The number of egress queues should equal the number of ingress queues. The packets can be synchronized by waiting until the ingress queues have packets that are ready for z sorting. Packets can be ready when all the ingress queues hold packets having the same packet number.

It is another aspect of the embodiments to take the z sorted packets from the egress queues and to alpha blend them to produce output packets. The output packets have a packet number and at least one pixel value.

Images can be produced from the output packets by, essentially, reversing the process by which image layers are packetized. Those skilled in the art of packetizing images are also aware of systems and methods for producing images from packets. The images can then be displayed on a display device.

The packets can also have a frame number. A digital video is made of a series of digital images that are displayed sequentially. Each digital image is a frame of the digital video. The frame number specifies where a particular image belongs in a digital video image sequence.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope of the invention.

Images and video can be produced by compositing or alpha blending a group of image layers or video layers. Increasing resolution or the number of layers results in increased computational demands. As such, the available computational resources limit the images and videos that can be produced. A computational architecture in which the image layers are packetized and streamed through processors can be easily scaled so to handle many image layers and high resolutions.

The image layers are packetized to produce packet streams. The packets in the streams are received, placed in queues, and processed. For alpha blending, ingress queues receive the packetized image layers which are then z sorted and sent to egress queues. The egress queue packets are alpha blended to produce an output image or video.

Figure 1:
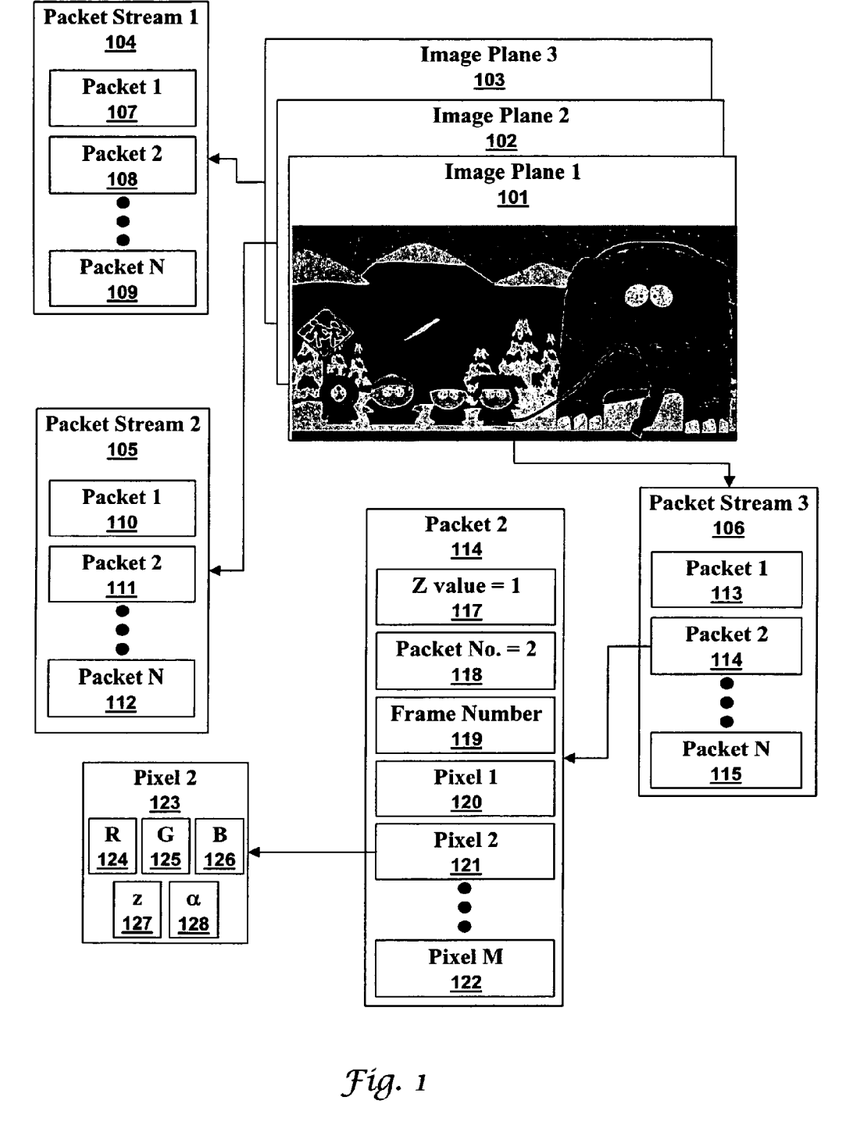
FIG. 1 illustrates packetizing image layers into packet streams in accordance with aspects of the embodiments.

FIG. 1 illustrates packetizing image layers into packet streams in accordance with aspects of the embodiments. Three image layers contain image content. Image plane 1 101, the first image layer, is packetized to produce packet stream 3 106 that contains packets including packet 1 113, packet 2 114, and packet N 115. As such, image plane 1 101 has been packetized into N packets.

Similarly, image plane 2 102 is packetized to produce packet stream 2 105 that contains packets including packet 1 110, packet 2 111, and packet N 112. The packets in different streams are usually different even if they have the same packet number. For example, packet 2 108 and packet 2 111 are different because each is part of a different packet stream. Image plane 3 103 is packetized to produce packet stream 1 104 that contains packets including packet 1 107, packet 2 108, and packet N 109. As such, image plane 1 101 has been packetized into N packets.

Each packet, such as packet 2 114 of packet stream 3 106 can contain a z value 117, a packet number 118, a frame number 119, and pixels. Z values, as discussed above, are used to determine which pixel or image layer is in front of another pixel or image layer. The packets in a packetized image plane can carry a z value when all the pixels in an image plane have the same z value. As such, packet 2 114 is illustrated as having a z value equal to 1 117 because all of the image plane 1 pixels have a z value equaling 1. The packet number 118 is illustrated as equaling 2 because packet 2 114 is the second packet in packet stream 3 106. The frame number 119 can be used to indicate to which frame in a video the packet belongs.

The packet also contains M pixels such as pixel 1 120, pixel 2 121, and pixel M 122. A pixel contains information for a dot in an image. Pixel 2 121 is illustrated as containing a red saturation value 124, a green saturation value 125, a blue saturation value 126, a z value 127, and an alpha value 128. As discussed above, the packet can contain a z value when all the pixels in the packetized image plane have the same z value. The pixels can also contain a z value. Pixels should contain a z value whenever the packets do not. As such, pixel 2 123 can contain a z value but doesn't need to because packet 2 114 contains a z value. If there were no z value contained in packet 2 114, then pixel 2 123 would need to contain a z value. The alpha value 128 can be used for alpha blending the pixel with other pixels that are behind it.

Figure 2:
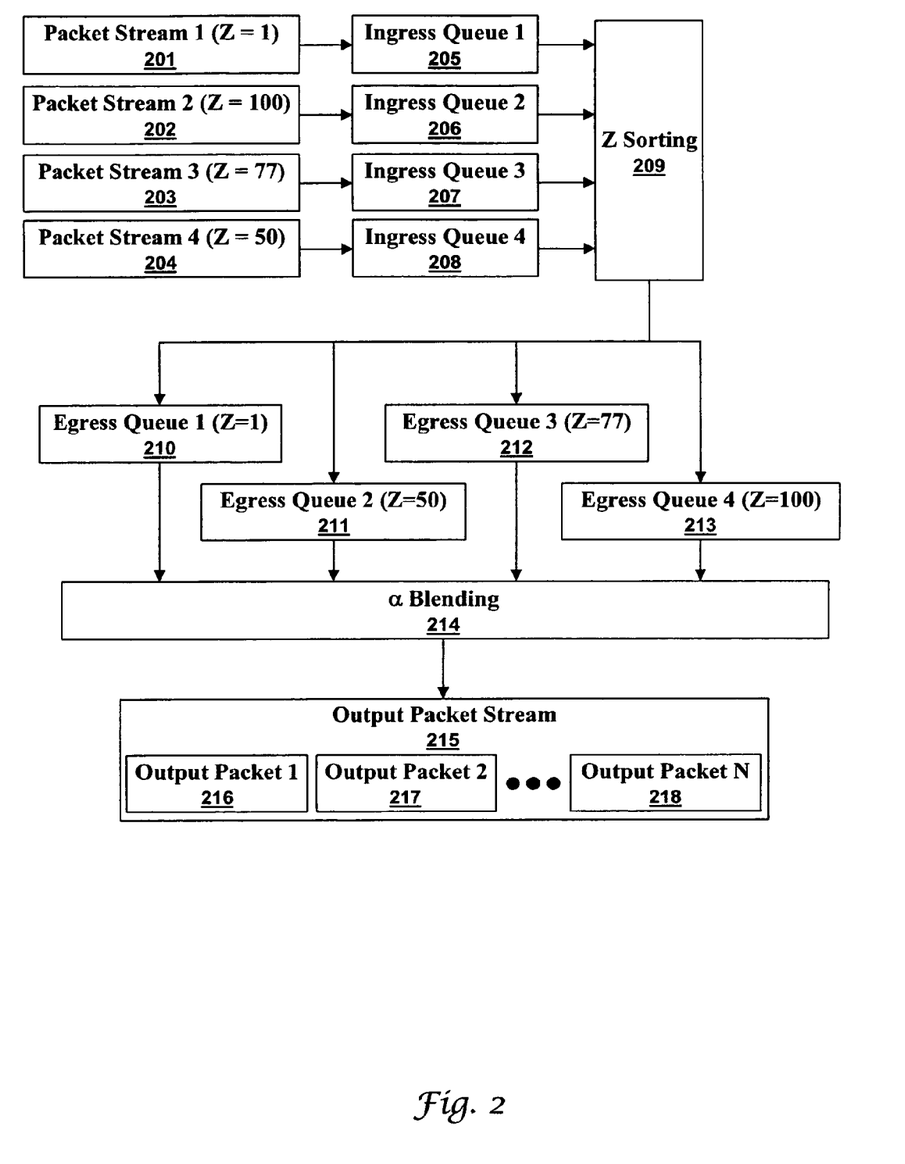
FIG. 2 illustrates z sorting and alpha blending packetized images in accordance with aspects of certain embodiments.

FIG. 2 illustrates a z sorting and alpha blending packetized images in accordance with aspects of certain embodiments. As the packets of packet stream 1 201 are received they are loaded into ingress queue 1 205. Similarly, packet stream 2 202 goes to ingress queue 2 206, packet stream 3 203 goes to ingress queue 3 207, and packet stream 4 204 goes to ingress queue 4 208.

The packets are then z sorted. Observe that packet stream 1 201 contains packets having a z value of 1, those in packet stream 2 202 have a z value of 100, those in packet stream 3 203 have a z value of 77, and those of packet stream 4 have a z value of 50. Z sorting results in the packets in ingress queue 1 205 being sent to egress queue 1 210, those in ingress queue 2 206 being sent to egress queue 4 213, those in ingress queue 3 207 being sent to egress queue 3 212, and those in ingress queue 4 208 being sent to egress queue 2 211.

The packets in the egress queues are then alpha blended 214. The result is a packet stream 215 having output packets such as output packet 1 216, output packet 2 217, and output packet N 218. The output packets can be assembled into an image or a video. Furthermore, the output packet stream can be treated as a packetized image layer and be composited or alpha blended with other image layers.

Figure 3:
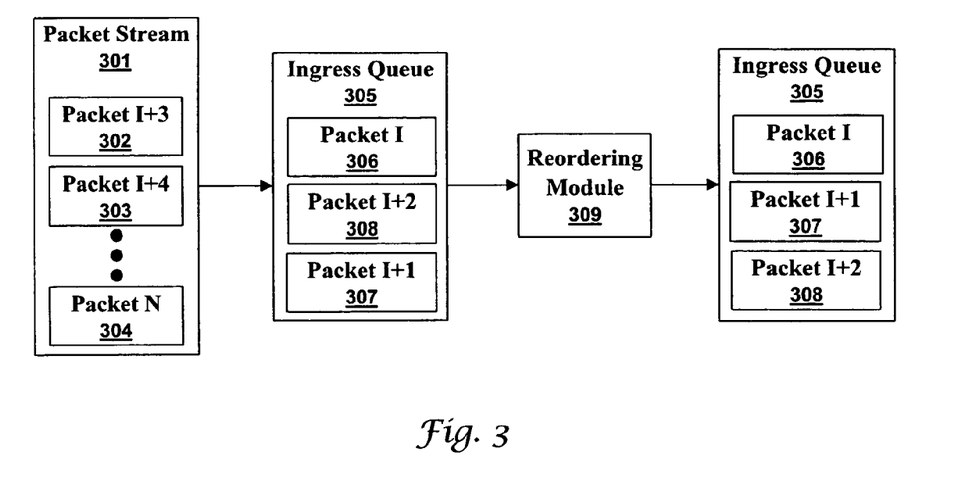
FIG. 3 illustrates reordering packets in accordance with aspects of certain embodiments.

FIG. 3 illustrates reordering packets in accordance with aspects of certain embodiments. A packet stream 301 is illustrated having packet I+3 302, packet I+4 303 and intermediate packets through to packet N 304. Packet I 306, packet I+1 307, and packet I+2 308 have already been queued in an ingress queue 305. As can be seen, packet I+2 308 is out of order because it is queued before packet I+1 307. A reordering module 309 puts the packets into the proper order. A similar result can be obtained by a pre queue reordering module that temporarily stores out of order packets until their immediate predecessor is queued. For example, a pre queue reordering module would store packet I+2 308 if packet I+1 307 is not queued on the ingress queue 305. After packet I+1 307 is queued, the pre queue reordering module would allow packet I+2 308 to be queued.

Figure 4:
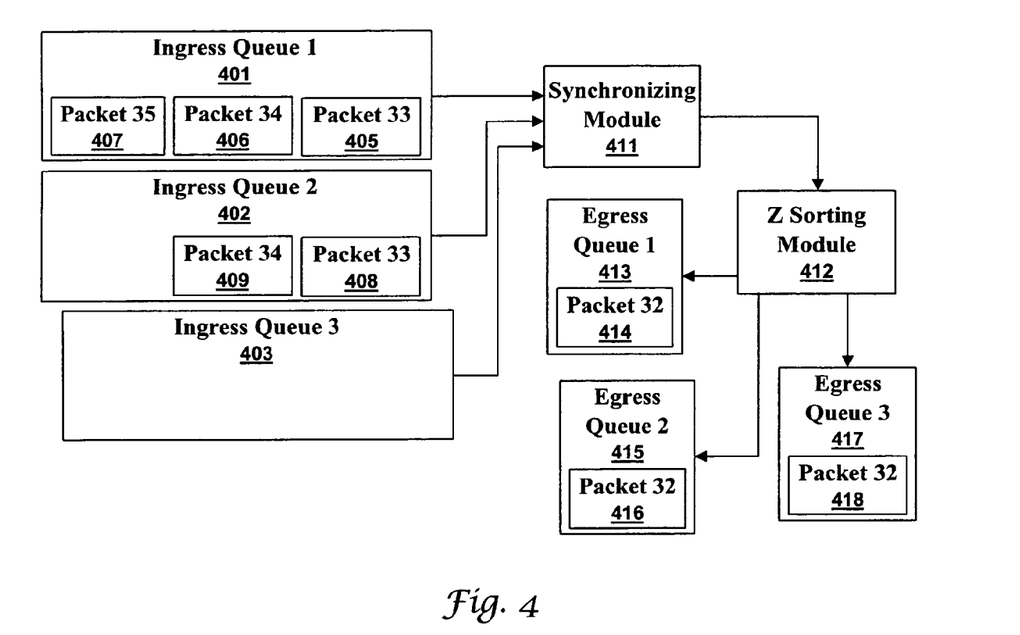
FIG. 4 illustrates synchronizing packets in accordance with aspects of certain embodiments.

FIG. 4 illustrates synchronizing packets in accordance with aspects of certain embodiments. Ingress queue 1 401 has received packet 33 405, packet 34 406 and packet 35 407 from a first packet stream. Ingress queue 2 402 has received packet 33 408, and packet 34 409 from a second packet stream. Ingress queue 3 403 is empty. The synchronizing module 411 prevents removal of any packets until Ingress queue 3 403 receives packet 33 from a third packet stream at which time all three packets having a packet number of 33 sorted by the z sorting module 412 and sent to egress queues. The three packets having packet number 32 414, 416, 418 have all been received, synchronized, and z sorted. Egress queue 1 413 contains packet 32 414 from one of the ingress queues, egress queue 2 415 contains packet 32 416 from a different ingress queue, and egress queue 3 417 contains packet 32 418 from the remaining ingress queue.

Figure 5:
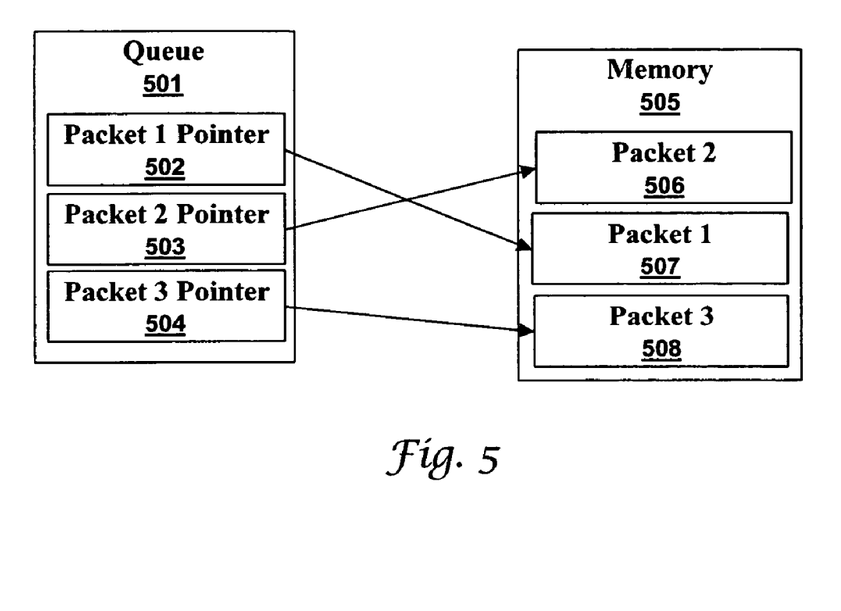
FIG. 5 using pointers in accordance with aspects of certain embodiments.

FIG. 5 using pointers in accordance with aspects of certain embodiments. Packets are received and stored into a memory 505. The memory can be any type of computer memory such as SRAM, DRAM, RDRAM, cache memory, registers, or other memory types. A pointer in the queue 501 references the packet. Packet 1 507, packet 2 506 and packet 3 508 are shown received and stored in memory 505. The queue 501 contains packet pointer 1 502 referencing packet 1 507, packet pointer 2 referencing packet 2 506, and packet pointer 3 504 referencing packet 3 508.

Figure 6:
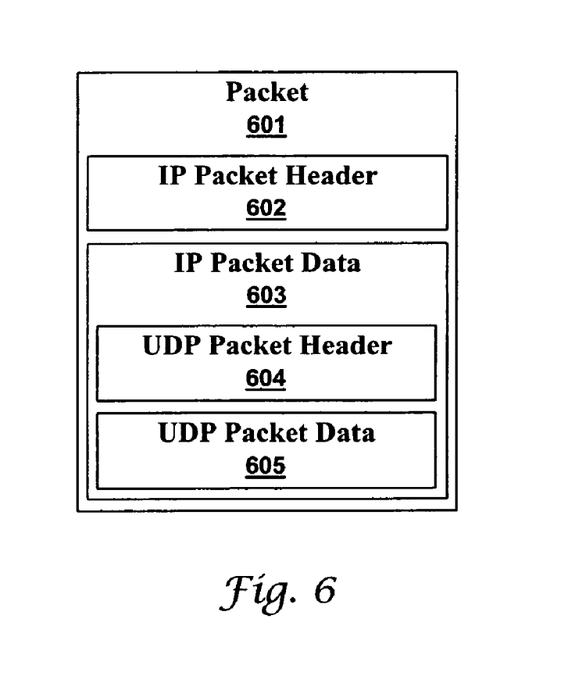
FIG. 6 illustrates types of packets in accordance with aspects of the embodiments.

FIG. 6 illustrates types of packets in accordance with aspects of the embodiments. A packet 601 is simply a bundle of data that can be transmitted. If the packet is an Internet Protocol (IP) packet, then it has an IP header 602 and IP packet data 603. If the packet is a User Datagram Protocol (UDP) packet, then the IP packet data 603 contains a UDP packet header 604 and UDP packet data 605. If a UDP packet stream contains a packetized image layer, then the UDP packet data 605 contains the image data, such as that contained in packet 2 114 of FIG. 1.

Figure 7:
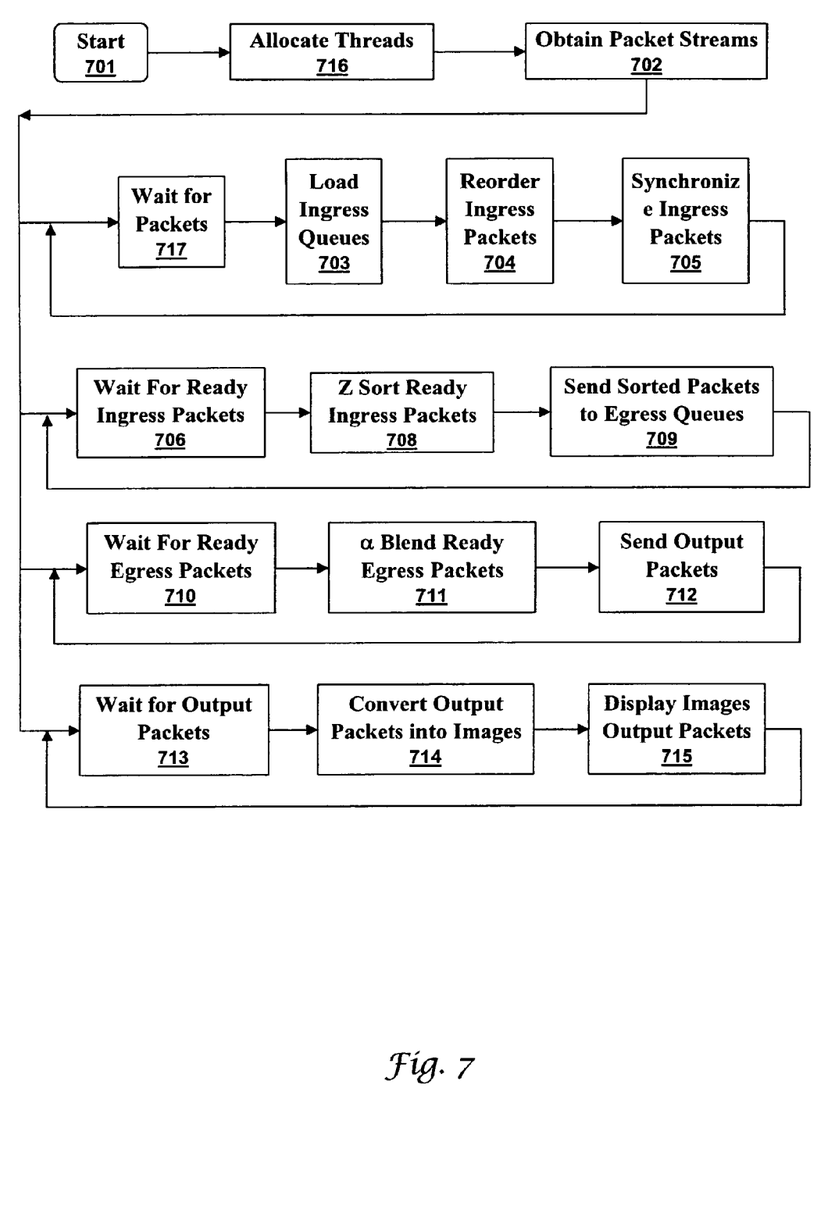
FIG. 7 illustrates a high level flow diagram of processing image layers in accordance with aspects of certain embodiments.

FIG. 7 illustrates a high level flow diagram of processing image layers in accordance with aspects of certain embodiments. After the start 701, threads are allocated 716 and packet streams are obtained 702 by packetizing image layers and sending them for processing. A thread, also known as an execution thread, can perform tasks such as those illustrated in FIG. 7. Multiple threads can perform tasks in parallel with different threads performing different tasks. FIG. 7 illustrates four related process flows can be performed in parallel because more than one thread can be allocated to the process flows. All four flows can run in parallel if each is allocated one or more thread. Alternatively, two or more of the four process flows can be performed sequentially by a single thread.

In the first flow, packets are waited for 717. The ingress queues can be loaded 703 after packets arrive. The packets can then be reordered 704 and synchronized 705. After synchronization the packets are ready ingress packets because all the packets having the same packet number are in ingress queues and are ready for further processing. The second flow waits for ready ingress packets 706, z sorts them 708, and sends them to egress queues 709. A third flow waits for ready egress packets 710, alpha blends them 711 and sends them 712. Egress packets are ready when all the packets having the same packet number are in egress queues. The fourth flow receives the output packets 713, converts them into images 714, and displays the images 715.

Figure 8:
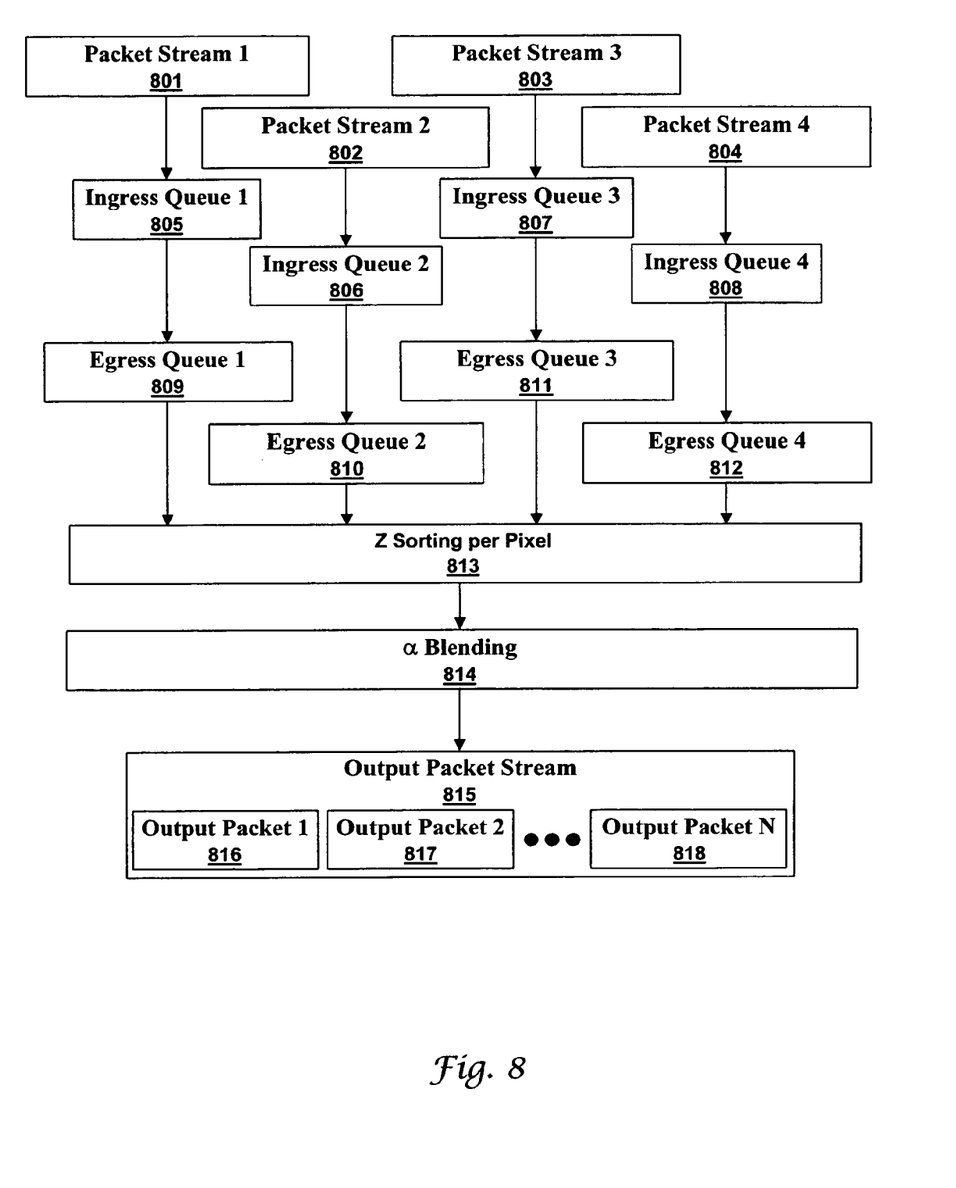
FIG. 8 illustrates z sorting and alpha blending packetized images in accordance with aspects of some embodiments.

FIG. 8 illustrates z sorting and alpha blending packetized images in accordance with aspects of some embodiments. As the packets of packet stream 1 801 are received they are loaded into ingress queue 1 805. Similarly, packet stream 2 802 goes to ingress queue 2 806, packet stream 3 803 goes to ingress queue 3 807, and packet stream 4 804 goes to ingress queue 4 808.

The packets can then be reordered and synchronized before being sent to egress queues. The packets in ingress queue 1 805 are sent to egress queue 1 809, those in ingress queue 2 806 are sent to egress queue 2 810, those in ingress queue 3 807 are sent to egress queue 3 811, and those in ingress queue 4 808 are sent to egress queue 4 812.

The packets in the egress queues are then z sorted per pixel 813. For example, every packet stream can have a pixel 11 of packet 15 in frame number 7. Given four packet streams, there are four such pixels. The four pixels can be sorted based on each pixel's z value.

The pixels are alpha blended 814 resulting in an output packet stream 815 having output packets such as output packet 1 816, output packet 2 817, and output packet N 818. The output packets can be assembled into an image or a video. Furthermore, the output packet stream can be treated as a packetized image layer and be composited or alpha blended with other image layers.

Figure 9:
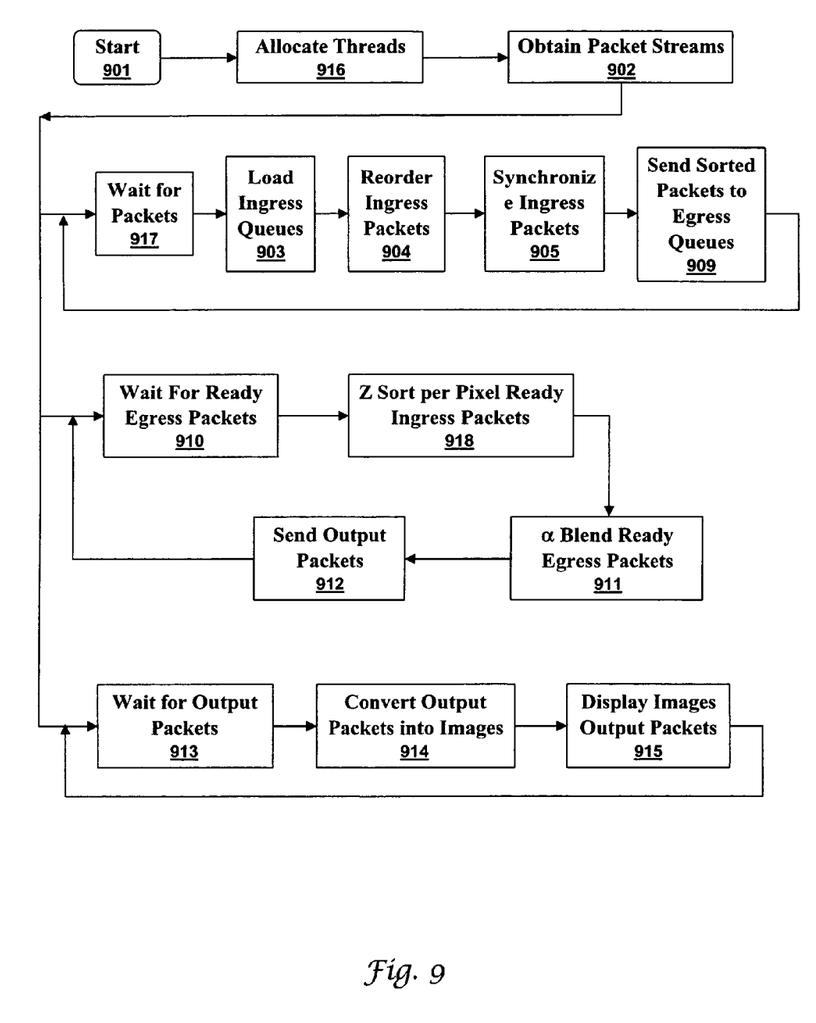
FIG. 9 illustrates a high level flow diagram of processing image layers in accordance with aspects of some embodiments.

FIG. 9 illustrates a high level flow diagram of processing image layers in accordance with aspects of some embodiments. After the start 901, threads are allocated 916 and packet streams are obtained 902 by packetizing image layers and sending them for processing. In the first flow, packets are waited for 917. The ingress queues can be loaded 903 after packets arrive. The packets can then be reordered 904 and synchronized 905, and sent to egress queues 909. A second flow waits for ready egress packets 910, z sorts them per pixel 918, alpha blends them 911 and sends them 912. The third flow receives the output packets 913, converts them into images 914, and displays the images 915.

Embodiments can be implemented in the context of modules. In the computer programming arts, a module (e.g., a software module) can be implemented as a collection of routines, data structures, firmware and hardware that perform particular tasks or implement a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment", "some embodiments", or "certain embodiments" do not necessarily refer to the same embodiment or any specific embodiment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for processing image layers comprising:
    configuring a first process flow by: packetizing each of a plurality of image layers into separate packet streams comprising a multiplicity of packets wherein each packet among the multiplicity of packets comprises a packet number, a z value, and at least one pixel, wherein each of the at least one pixel comprises an alpha value and at least one pixel value, and wherein the z value for each packet is equal to a pixel z value shared by all of the at least one pixel in the packet;
        ordering the packets among the multiplicity of packets based on the packet number of each of the packets;
        loading each of the at least two packet streams into separate ingress queues;
    configuring a second process flow by taking the packets from the separate ingress queues, sorting the packets based on z value to produce z sorted packets, and loading the z sorted packets into at least two egress queues, wherein the number of egress queues equals the number of separate ingress queues;
    configuring a third process flow by taking the z sorted packets from the at least two egress queues, and alpha blending the at least one pixels in the packets to produce a multitude of output packets comprising a packet number and at least one pixel, wherein each of the at least one pixel comprises at least one pixel value;
    configuring a fourth process flow by producing an image from the multitude of output packets and presenting the image on a display device; and
    allocating a plurality of execution threads to one or more of the first process flow, the second process flow, the third process flow and the fourth process flow such that the process flows run in parallel and wherein two or more of the process flows are performed sequentially by one of the plurality of executing threads.

2. The method of claim 1 further comprising synchronizing the packets within the separate ingress queues before sorting wherein the packets are synchronized based on the packet number within each packet.

3. The method of claim 1 further comprising reordering the packets within at least one of the separate ingress queues after loading the separate input queues wherein the packets are reordered based on the packet number within each packet.

4. The method of claim 1 wherein each one of the packets further comprises a frame number and wherein each one of the output packets further comprises a frame number.

5. The method of claim 1 wherein the separate ingress queues are loaded by storing the packet within a memory and placing a pointer in the ingress queue.

6. A method comprising:
    configuring a first process flow by: packetizing each of a plurality of image layers into separate packet streams comprising a multiplicity of packets wherein each packet among the multiplicity of packets comprises a packet number and at least one pixel, wherein each of the at least one pixel comprises an alpha value, a z value, and at least one pixel value, and wherein the z value for each packet is equal to a pixel z value shared by all of the at least one pixel in the packet;
        ordering the packets among the multiplicity of packets based on the packet number of each of the packets;
        loading each of the at least two packet streams into separate ingress queues, taking the packets from the separate ingress queues and loading the packets into at least two egress queues, wherein the number of egress queues equals the number of separate ingress queues;
    configuring a second process flow by taking the packets from the at least two egress queues, z sorting per pixel based on the z value within each one of the at least one pixel to produce z sorted pixels;
    configuring a third process flow by alpha blending the z sorted pixels to produce a multitude of output packets comprising a packet number and at least one pixel, wherein each of the at least one pixel comprises at least one pixel value; and
    configuring a fourth process flow by producing an image from the multitude of output packets and presenting the image on a display device; and
    allocating a plurality of execution threads to one or more of the first process flow, the second process flow, the third process flow and the fourth process flow such that the process flows run in parallel and wherein two or more of the process flows are performed sequentially by one of the plurality of executing threads.

7. The method of claim 6 wherein at least one of the multiplicity of packets is a UDP packet.

8. The method of claim 6 further comprising producing an image from the multitude of output packets and presenting the image on a display device.

9. The method of claim 6 further comprising:
    loading the separate ingress queues with the packets from the at least two packet streams;
    synchronizing the packets loaded within the separate ingress queues wherein the packets are synchronized based on the packet number within each packet; and
    taking the packets from the separate ingress queues to be loaded into the at least two egress queues.

10. The method of claim 6 further comprising:
    loading the separate ingress queues with the packets from the at least two packet streams;
    reordering the packets loaded within at least one of the separate ingress queues wherein the packets are reordered based on the packet number within each packet; and
    taking the packets from the at least two ingress queues to be loaded into the at least two egress queues.

11. The method of claim 6 wherein each one of the packets further comprises a frame number and wherein each one of the output packets further comprises a frame number.

12. The method of claim 6 wherein loading the at least two egress queue comprises storing each one of the multiplicity of packets within a memory and placing at least one pointer in the at least two egress queue.

13. The method of claim 6 wherein at least one of the multiplicity of packets is a UDP packet, wherein each one of the packets further comprises a frame number and wherein each one of the output packets further comprises a frame number, wherein the egress queue is loaded by storing each one of the multiplicity of packets within a memory and placing at least one pointer in the at least two egress queue; and wherein the method of claim 7 further comprises:
   loading the separate ingress queues with the packets from the at least two packet streams;
   reordering the packets loaded onto at least one of the separate ingress queues wherein the packets are reordered based on the packet number within each packet
   synchronizing the packets loaded onto the separate ingress queues wherein the packets are synchronized based on the packet number within each packet;
   taking the packets from the separate ingress queues to be loaded into the at least two egress queues; and
   producing an image from the output packets and presenting the image on a display device.

14. A system comprising:
   separate ingress queues for separately receiving each of at least two packet streams comprising a multiplicity of packets comprising a packet number, a z value, and at least one pixel, wherein each of the at least one pixel comprises an alpha value and at least one pixel value, and wherein the z value for each packet is equal to a pixel z value shared by all of the at least one pixel in the packet;
   a reordering module executed by a processor, configured to reorder the multiplicity of packets received by the separate ingress queues based on the packet number of each of the packets;
   a temporary storage for storage of packets that are out of order until an immediate predecessor packet is received;
   at least one sorting module that obtains packets from the separate ingress queues and puts the packets onto at least two egress queues based on the z value of the packets, wherein the number of egress queues equals the number of separate ingress queues;
   a blending module that obtains packets from the at least two egress queues and alpha blends the at least one pixel in the packets to produce a multitude of output packets comprising a packet number and at least one pixel, wherein each of the at least one pixel comprises at least one pixel value.

15. The system of claim 14 wherein the at least two packet streams comprise a multiplicity of IP packets.

16. The system of claim 14 further comprising a synchronization module that can synchronize the multiplicity of packets received by the at least two ingress queues.

17. The system of claim 14 further comprising at least one network processor wherein at least one of the at least one network processor comprises at least one of the separate ingress queues and at least one of the at least one sorting module.

18. The system of claim 14 further comprising at least one network processor wherein at least one of the at least one network processor comprises a blending module and at least one of the at least two egress queues.

* * * * *